(12) United States Patent
Richard et al.

(10) Patent No.: US 11,022,553 B2
(45) Date of Patent: Jun. 1, 2021

(54) SURFACE INSPECTION SYSTEM AND SURFACE INSPECTION METHOD

(71) Applicant: BOBST MEX SA, Mex (CH)

(72) Inventors: Matthieu Richard, Remoray (FR); Francis Pilloud, Clarens (CH)

(73) Assignee: BOBST MEX SA

( * ) Notice: Subject to any disclaimer, the term of this patent is extended or adjusted under 35 U.S.C. 154(b) by 87 days.

(21) Appl. No.: 16/099,042

(22) PCT Filed: May 29, 2017

(86) PCT No.: PCT/EP2017/025150
§ 371 (c)(1),
(2) Date: Nov. 5, 2018

(87) PCT Pub. No.: WO2017/207116
PCT Pub. Date: Dec. 7, 2017

(65) Prior Publication Data
US 2019/0154578 A1    May 23, 2019

(30) Foreign Application Priority Data
May 30, 2016    (EP) ..................................... 16172031

(51) Int. Cl.
*G01N 21/57*    (2006.01)
*G01N 21/86*    (2006.01)
(Continued)

(52) U.S. Cl.
CPC .............. *G01N 21/57* (2013.01); *G01N 21/86* (2013.01); *G01N 21/8901* (2013.01);
(Continued)

(58) Field of Classification Search
CPC ... G01N 21/57; G01N 21/86; G01N 2021/559
See application file for complete search history.

(56) References Cited

U.S. PATENT DOCUMENTS

| 5,087,822 | A | 2/1992 | Fairlie et al. |
| 6,166,393 | A | 12/2000 | Paul et al. |

(Continued)

FOREIGN PATENT DOCUMENTS

| CN | 101449151 A | 6/2009 |
| CN | 103486539 A | 1/2014 |

(Continued)

OTHER PUBLICATIONS

International Search Report dated Sep. 29, 2017 in corresponding PCT International Application No. PCT/EP2017/025150.

(Continued)

*Primary Examiner* — Rebecca C Bryant
(74) *Attorney, Agent, or Firm* — Ostrolenk Faber LLP

(57) ABSTRACT

A surface inspection system (10) for inspecting the surface of sheet elements (4) present in an inspection area (20). The system includes an image evaluation unit (18), a camera (12), a dark-field illuminator (14) and a bright-field illuminator (16). The image evaluation unit (18) subtracts a line image captured under bright-field illumination conditions from a line image captured under dark-field illumination conditions. A method of identifying highly reflective surface areas on a sheet element (4) being moved through a sheet element processing machine, wherein first a line image ($I_{16}$) of the surface of the sheet element (4) in the viewing area (20) is captured under bright-field illumination conditions and a line image ($I_{14}$) of the same surface of the sheet element (4) in the viewing area (20) is captured under dark-field illumination conditions, and then the two line images ($I_{14}$, $I_{16}$) are compared, in particular subtracted from each other, wherein the surface is identified as being reflective if the difference ($S_n$) between the two line images ($I_{14}$, $I_{16}$) is above a predefined threshold.

16 Claims, 3 Drawing Sheets

(51) Int. Cl.
  *G01N 21/89* (2006.01)
  *G01N 21/88* (2006.01)
(52) U.S. Cl.
  CPC ............... *G01N 2021/8822* (2013.01); *G01N 2021/8825* (2013.01); *G01N 2201/062* (2013.01)

(56) References Cited

U.S. PATENT DOCUMENTS

| | | |
|---|---|---|
| 6,327,374 B1 | 12/2001 | Piironen et al. |
| 2008/0245979 A1 | 10/2008 | Banton et al. ............. 250/559.4 |
| 2008/0285023 A1 | 11/2008 | Tsai et al. |
| 2011/0304862 A1 | 12/2011 | Itoh et al. |

FOREIGN PATENT DOCUMENTS

| | | |
|---|---|---|
| CN | 104897693 A | 9/2015 |
| EP | 0 898 163 A1 | 2/1999 |
| EP | 2 397 840 A2 | 12/2011 |
| JP | 2000-241362 A | 9/2000 |
| JP | 2008-256691 A | 10/2008 |
| JP | 2012-002601 A | 1/2012 |
| JP | 2012-042297 A | 3/2012 |
| WO | WO 99/10730 A1 | 3/1999 |

OTHER PUBLICATIONS

Written Opinion dated Sep. 29, 2017 in corresponding PCT International Application No. PCT/EP2017/025150.

SURFACE INSPECTION SYSTEM AND SURFACE INSPECTION METHOD

CROSS-REFERENCE TO RELATED APPLICATIONS

The present application is a 35 U.S.C. §§ 371 national phase conversion of PCT/EP2017/025150, filed May 29, 2017, which claims priority of European Patent Application No. 16172031.3, filed May 30, 2016, the contents of which are incorporated by reference herein. The PCT International Application was published in the English language.

TECHNICAL FIELD

The invention relates to a surface inspection system for inspecting the surface of sheet elements present in an inspection area. The invention further relates to a method of identifying highly reflective surface areas on a sheet element being moved through a sheet element processing machine. The invention can in particular be implemented in a quality control station in a sheet element processing machine.

TECHNICAL BACKGROUND

The term "sheet element processing machine" is here intended to comprise any machine which is being used for processing sheet elements such as paper, cardboard, plastic foil or similar materials, in particular printing machines, coating machines, laminating machines and converting machines for example cutting, stamping, folding and/or gluing machines.

On the sheet element, highly reflective "glossy" surfaces can be present because foil, holograms, varnish or a similar structure is present. It is desirable for many reasons to be able to determine the positions of glossy surfaces on a sheet element, as many quality checks are based on checking the position of one element with respect to another element. However, it is not an easy task to detect the position of glossy surfaces on a sheet element being moved at speeds of up to 15 m/s through a sheet element processing machine.

SUMMARY OF THE INVENTION

It is therefore an object of the invention to provide a system and a method which allow reliably detecting the position of glossy surfaces on a sheet element that is moved through a sheet element processing machine.

In order to achieve this object, the invention provides a surface inspection system for inspecting the surface of sheet elements present in an inspection area, comprising an image evaluation unit, a camera, a dark-field illuminator and a bright-field illuminator. The image evaluation unit is adapted for comparing a line image captured under bright-field illumination conditions with a line image captured under dark-field illumination conditions. This object is also achieved with a method of identifying highly reflective surface areas on a sheet element being moved through a sheet element processing machine, in particular by using the system as defined above, wherein first a line image of the surface of the sheet element in the viewing area is captured under bright-field illumination conditions and a line image of the same surface of the sheet element in the viewing area is captured under dark-field illumination conditions. Then the two line images are compared, for example subtracted from each other, wherein the surface is identified as being reflective if the difference between the two line images is above a predefined threshold.

The invention is based on the general concept of taking advantage of the difference in reflection which can be observed when illuminating diffusion causing reflecting surfaces like a Lambertian diffuser e.g. white paper on the one hand and glossy surfaces e.g. a foil, a hologram or varnish on the other hand. When the illuminators illuminate a diffusion causing reflecting surface, the intensity of the line image captured by the camera is almost identical. When the illuminators illuminate a highly reflective surface, then the intensity, seen by the camera, of the light originating from the bright-field illuminator is much higher than the intensity of the light originating from the dark-field illuminator. This difference can be detected relatively easily even at a sheet element being moved at high speeds.

The camera can be a 2D camera area camera. In view of the amount of data to be processed, however, it is preferred to use a line camera.

In view of the camera being preferably a line camera, the term "line image" is used herein when referring to the images captured by the camera. If the camera however is an area camera, the line image captured by the camera does not consist of a single line only but of a plurality of lines.

According to a preferred embodiment, the dark-field illuminator comprises a single row of LEDs along which two oppositely arranged reflectors are provided. Thus, the dark-field illuminator provides a light which is far from specular to prevent any steep reflective area appearing bright when illuminated by the dark-field illuminator.

The bright-field illuminator preferably comprises a plurality of rows of LEDs which are arranged in parallel. The different rows are arranged with different optical planes so that there will always be some light which is being directly reflected, under close-to-specular reflection conditions, towards the camera even if the surface of the sheet element in the viewing area is not perfectly plane. Thus, bright-field conditions are maintained even for steep areas on the sheet element.

The line image captured under bright-field illumination can be very easily compared with the line image captured under dark-field illumination if the intensity of the light originating from the dark-field illuminator is, at the camera, the same as the intensity of the light originating from the bright-field illuminator when a sheet element is being inspected which has a diffusion causing reflecting surface. If the comparison is made by subtracting the line images from each other, then the result is zero for surface portions which are not reflective.

In a preferred embodiment, the optical plane of the dark-field illuminator is arranged at an angle of approx 45° with respect to a plane which is perpendicular to the orientation of the viewing area. The optical plane of the bright-field illuminator is arranged at an angle of approx 30° with respect to a plane which is perpendicular to the orientation of the viewing area, and the viewing plane of the camera is arranged at an angle of approx. 20° with respect to a plane which is perpendicular to the orientation of the viewing area. This arrangement has proven to yield good results.

With a view to achieving the desired precision when determining the position of glossy surfaces on the sheet element, the camera has a resolution, at the surface of the sheet element to be inspected, in the range of 0.05 to 0.6 mm and preferably of the order of 0.1 mm. A higher resolution is generally possible but produces more data having to be analyzed.

For determining the position of glossy surfaces on the sheet element, it is sufficient to compare the two line images as regards their intensity.

The images can be compared line by line and pixel by pixel so as to obtain precise information on the position of glossy surfaces both in the x direction and the y direction.

As an alternative, a reconstructed image is being created based on the line images captured under dark-field illumination, and a reconstructed image is created based on the line images captured under bright-field illumination conditions, wherein reflective surfaces are identified by comparing the reconstructed images. This comparison can be made either for the entire reconstructed images or for selected parts only.

The sheet element is moved with respect to the surface inspection system with a speed in the order 1 to 15 m/s. In order to allow a determination of the position in the x direction with the desired precision, it is preferred that the camera be adapted for capturing more than 10,000 line images and preferably more than 40,000 line images/s.

The invention will now be described with reference to a preferred embodiment which is shown in the enclosed drawings. In the drawings,

DESCRIPTION OF AN EMBODIMENT

Figure 1:
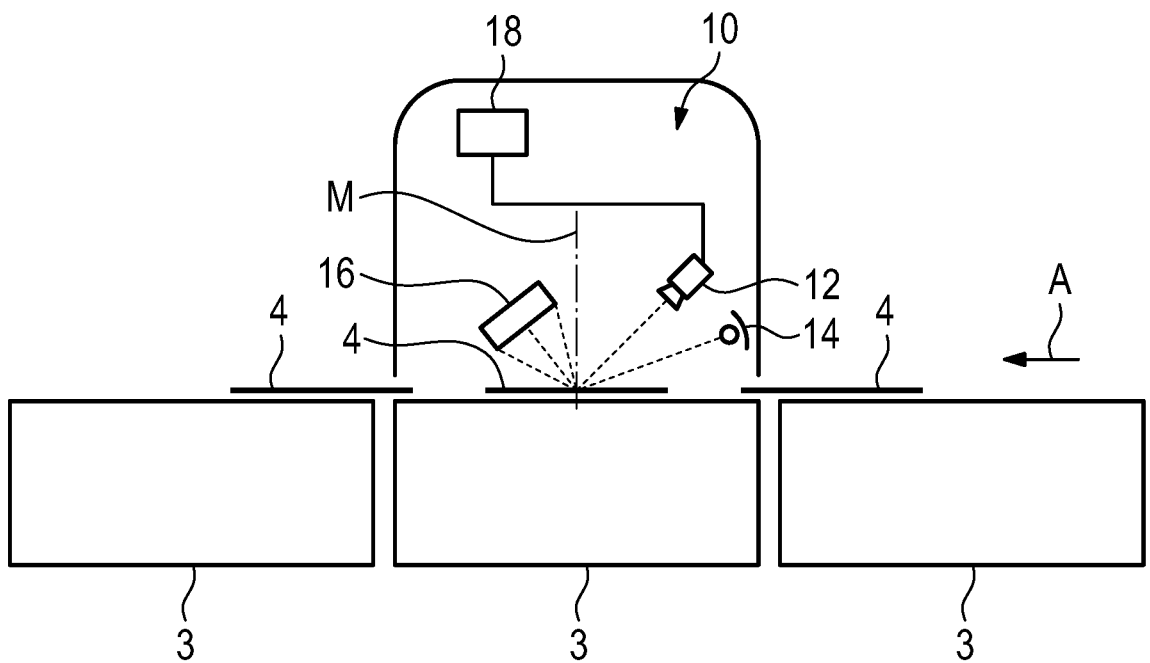
FIG. 1 schematically shows in a side view a surface inspection system according to the invention employed in a quality control station of a sheet element processing machine.
Figure 2:
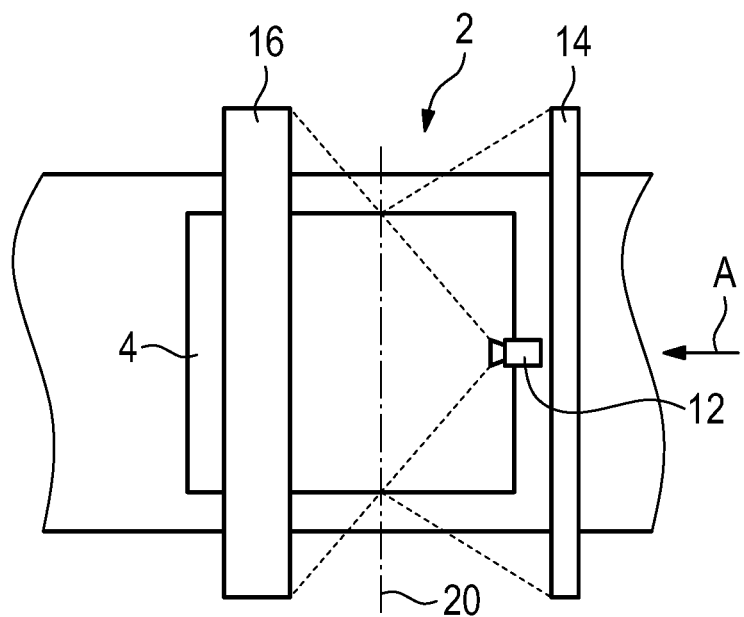
FIG. 2 schematically shows the surface inspection system of FIG. 1 in a top view.
Figure 3:
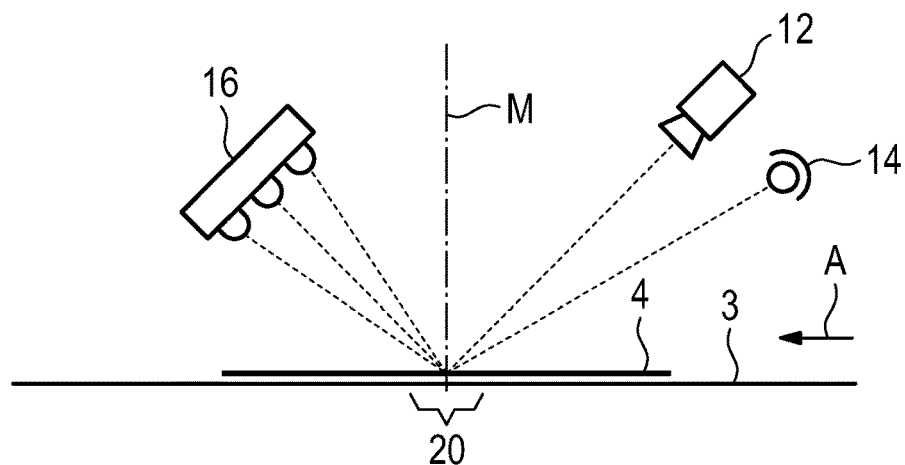
FIG. 3 schematically shows the surface inspection system of FIG. 1 in greater detail.

In FIG. 1, a quality control station 2 is schematically shown, which is employed in a sheet element processing machine of which conveyor tables 3 can be seen. The sheet element processing machine can process sheet elements 4 which are being transported in the direction of arrow A. The sheet elements 4 can be sheets of paper, cardboard, plastic foil or a similar material, or they can be in the form of a longer web. The sheet element processing machine can be a printing machine, a stamping machine, a laminating machine, a folding machine, a gluing machine, etc.

The quality control station 2 is used for controlling the quality of the sheet elements 4. In particular, the quality control station 2 is used for determining the position of "glossy portions" on the surface of the sheet elements 4. "Glossy portions" are portions with a highly reflective surface. Examples of such glossy portions are holograms, foil and/or varnish present on the sheet element 4.

The quality control station comprises a surface inspection system 10. The surface inspection system 10 comprises a camera 12, a dark-field illuminator 14, a bright-field illuminator 16 and an image evaluation unit 18.

Camera 12 is configured for capturing a line image of a viewing area a line of interest 20 which extends perpendicularly to the direction A over the entire width of the sheet element processing machine. It is arranged at an angle of approx. 20° with respect to a median plane M which is perpendicular to the surface of the sheet elements 4 within the viewing area.

Dark-field illuminator 14 is adapted for illuminating the viewing area 20. The optical plane of the dark-field illuminator 14 is arranged at an angle of approx. 45° with respect to the median plane.

Dark-field illuminator 14 can generally be of any type. In a particular embodiment, it comprises a row of LEDs arranged adjacent each other, and two reflectors arranged opposite each other along the row of LEDs. This type of illuminator can be used for illuminating the surface of the sheet elements 4 in the viewing area 20 with an intensity which is constant despite variations in height.

Bright-field illuminator 16 is also adapted for illuminating the viewing area 20. The optical plane of the bright-field illuminator 16 is arranged at an angle of approx. 30° with respect to the median plane.

Bright-field illuminator 16 can generally be of any type. In a particular embodiment, it comprises several parallel rows of LEDs arranged adjacent each other, with each row being adapted for illuminating viewing area 20. This type of illuminator can be used in different applications for directing light in different directions to viewing area 20.

Further, a diffuser can be used for ensuring an even radiance when seen from viewing area 20 in order to have an even bright-field illuminator.

In view of the fact that illuminator 14 is being used as a dark-field illuminator, it is arranged on the same side of median plane M as camera 12. Illuminator 16 however is arranged on the opposite side of median plane M, since it is being used as a bright-field illuminator. Depending on the particular circumstances, it is possible to use only one of the different rows of LEDs, namely the one which has its optical plane inclined with respect to median plane M by an angle close to 20°. In other words, it is the row of LEDs which camera 12 could see under specular reflection conditions on the surface of sheet element 4. As an alternative, several rows of LEDs of bright-field illuminator 16 are being used, with the optical plane of some of the rows being inclined at angles which are different from the angle at which camera 12 is arranged with respect to median plane M.

The important point here is that the power of the dark-field illuminator 14 and the power of the bright-field illuminator 16 are set or controlled such that the intensity of the light reflected to camera 12 from a diffusion causing reflecting surface of sheet element 4 is the same for both illuminators. In other words, the intensity of light originating from bright-field illuminator 16, reflected on a diffusion causing reflecting surface of sheet element 4 in viewing area 20 and then received by camera 12 is the same as the intensity of reflected light originating from dark-field illuminator 14, reflected on the same diffusion causing reflecting surface of sheet element 4 in viewing area 20 and then received by camera 12.

The diffusion causing reflecting surface can be of paper or cardboard.

For inspecting the surface of sheet elements moved through quality inspection station 2, both illuminators 14, 16 are activated one after the other, and camera 12 captures a line image for each illumination situation. These line images are evaluated by image evaluation unit 18. The line images can in particular be subtracted from each other.

The method of determining the position of glossy surface portions on sheet elements 4 will now be described with reference to FIG. 4 which helps understanding the basic principle underlying the subject image evaluation.

Figure 4:
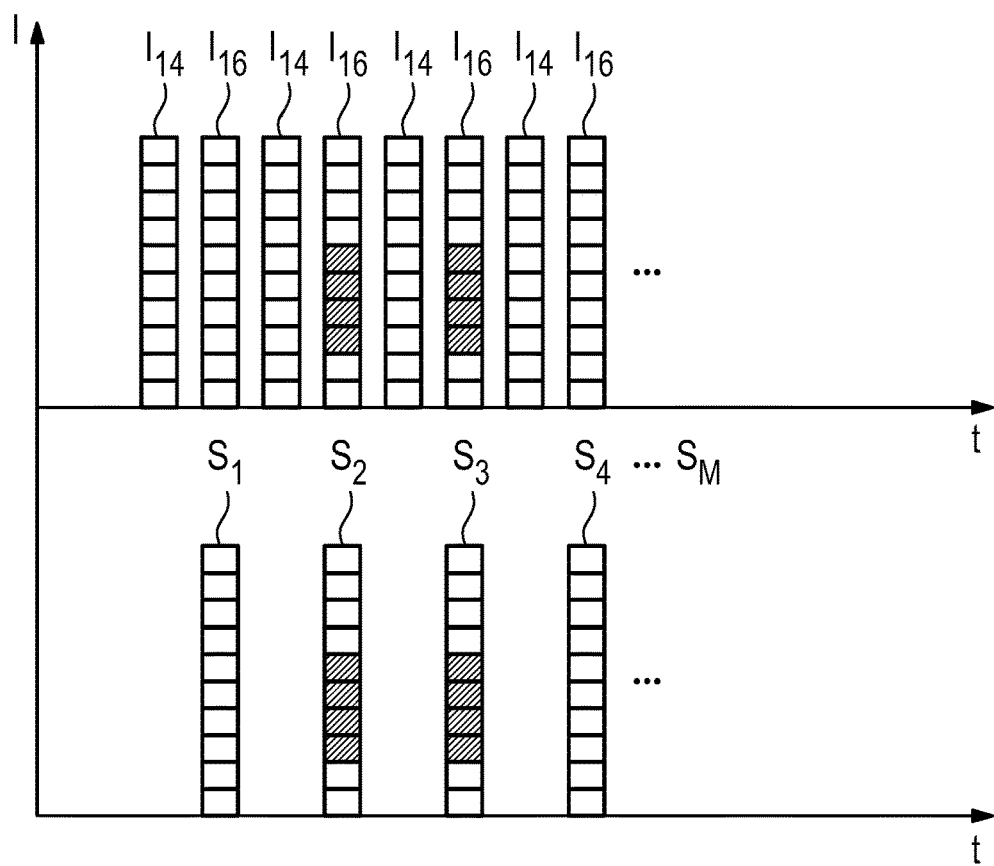
FIG. 4 schematically shows different line images captured by the camera of the surface inspection system, and the result of a comparison of the line images.

FIG. 4 schematically shows in the upper half line images which are being captured by camera 12. In this example, each line image is shown to be twelve pixels wide. In practice, a line image covering the entire width of the viewing area 20 will consist of several thousands to several ten thousands of pixels as camera 12 usually has a resolution, in the viewing area at the level of the surface of the sheet elements, of the order of 0.05 mm to 0.3 mm and preferably of 0.1 mm.

The line images are here being captured in pairs, with the first line image $I_{14}$ being captured under dark-field illumination by means of dark-field illuminator 14, and line image $I_{16}$ is being captured under bright-field illumination by means of bright-field illuminator 16. It obviously could be the other way around as well.

The maximum rate at which line images are captured depends on the rate at which the illuminators 14, 16 can be switched on and off. Rates of up to 80 kHz are possible. Accordingly, camera 12 captures 80,000 line images per second.

The first pair of line images $I_{14}$, Ie is being captured from a surface in viewing area 20 which is diffusion causing reflecting. As the power of both illuminators was adjusted to result in the same intensity at camera 12, both line images are identical. This is here indicated by the pixels of the line image being empty which signifies a low intensity of captured light.

In the lower half of FIG. 4, the result of an image evaluation performed by image evaluation unit 18 is shown. Here, the line images are subtracted from each other. Since the line images are identical, the result of the subtraction is zero for each pixel. This is here indicated by empty pixels in subtracted image $S_1$.

The second pair of line images $I_{14}$, $I_{16}$ is being captured from a surface in viewing area 20 which is diffusion causing reflecting for the majority of the width but which has a highly reflective portion, e.g. a stamped metallic foil which here is four pixels wide. The result is that camera 12 captures, when being illuminated by dark-field illuminator 14, even less intensity than before as the light is being reflected away from the camera. The pixels of line image $I_{14}$ are accordingly empty. When however the line images are illuminated by bright-field illuminator 16, camera 12 captures a high intensity as at least some of the light is directly reflected towards the camera. Accordingly, the four pixels where the stamped metallic foil reflects the light are shown black in order to signify a high intensity.

When subtracting the two line images from each other, the result is again zero for those pixels which were illuminated under diffuse reflection. For the pixels in the area of the hologram however, the subtraction results in a high value either positive or negative, depending from the order in which the two line images are being subtracted from each other. This high value is indicated by black pixels in subtracted image $S_2$.

For the third pair of line images $I_{14}$, $I_{16}$, the situation is the same as before; it is here assumed that the stamped metallic foil has not yet completely passed through the viewing area.

The fourth pair of line images $I_{14}$, $I_{16}$ corresponds to a situation in which the hologram has been completely moved through the viewing area 20 so that sheet element 4 has a diffusion causing reflecting surface in viewing area 20. Accordingly, the intensity of both captured line images is identical, and the result of the subtraction is zero for all pixels.

It is thus possible to determine where both in the x direction and the y direction, glossy surface portions are present on a sheet element being moved through viewing area 20.

It can be understood that the term "same intensity under diffuse reflection" is not to be understood in a mathematical sense. Due to tolerances, the intensity will vary, and the intensity will also vary with the particular diffusion causing reflecting surface which is being illuminated. "The same intensity" thus means that the intensity of the light originating from either illuminator 14, 16 and reflected on a diffusion causing reflecting surface is below a certain threshold which is chosen such that the intensity of the light originating from the bright-field illuminator 16 and reflected from a glossy surface being above this threshold. The threshold can be chosen depending on the surfaces being inspected. As an example, a difference in intensity <1% can be chosen for varnish+foil while a difference <10% can be chosen for foil only.

Different thresholds can be implemented by adjusting the power of the LEDs or by adjusting a coefficient applied to the captured line images.

It is also possible to analyze the captured line images regarding their grayscale intensity and to have the image evaluation unit analyze an image composed of subtracted images as regards sudden changes of the grayscale intensity.

Based on FIG. 4, it was described that the line images obtained under bright-field illumination and the line images obtained under dark-field illumination are compared line by line. In practice, from the interlaced line images captured under the different illumination conditions, a reconstructed BFI image, reconstructed image consisting of the line images captured under bright-field illumination and a reconstructed DFI image, reconstructed image consisting of the line images captured under dark-field illumination will be created, and these images will be analyzed by the image evaluation unit.

Figure 5:
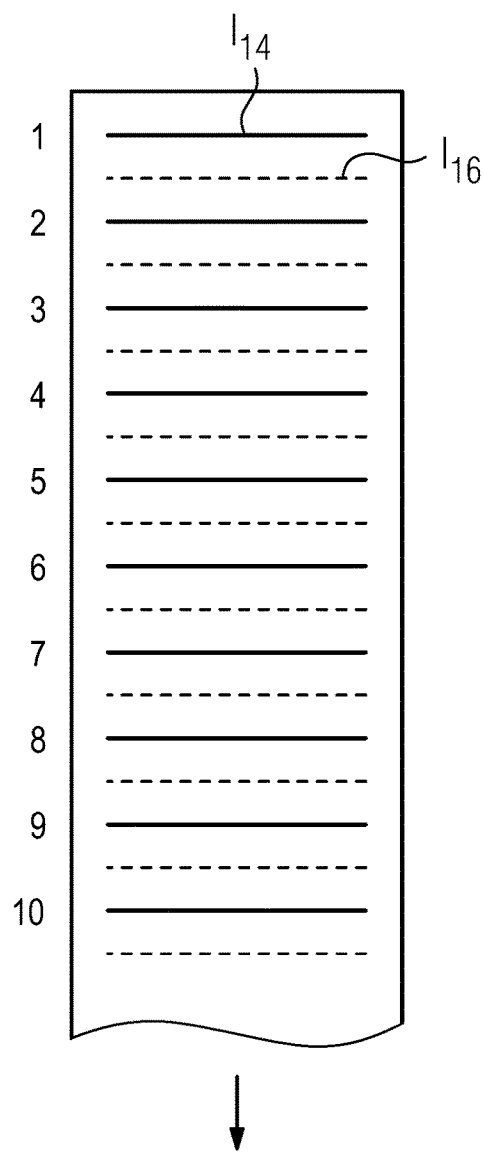
FIG. 5 schematically shows the different line images captured by the camera.

FIG. 5 schematically shows the interlaced line images $I_{14}$ shown in normal lines and Is shown in dotted lines captured by the camera. Here, only ten of the line images of each illumination condition are shown. In practice, several thousands of line images $I_{14}$, $I_{16}$ are being captured for each sheet element 4. Assuming that 4,000 line images $I_{14}$ and 4,000 line images $I_{16}$ are being captures for one sheet element 4 and that camera 12 is able to capture 80,000 line images per second, then ten sheet elements, 4 per second, can be processed.

Figure 6:
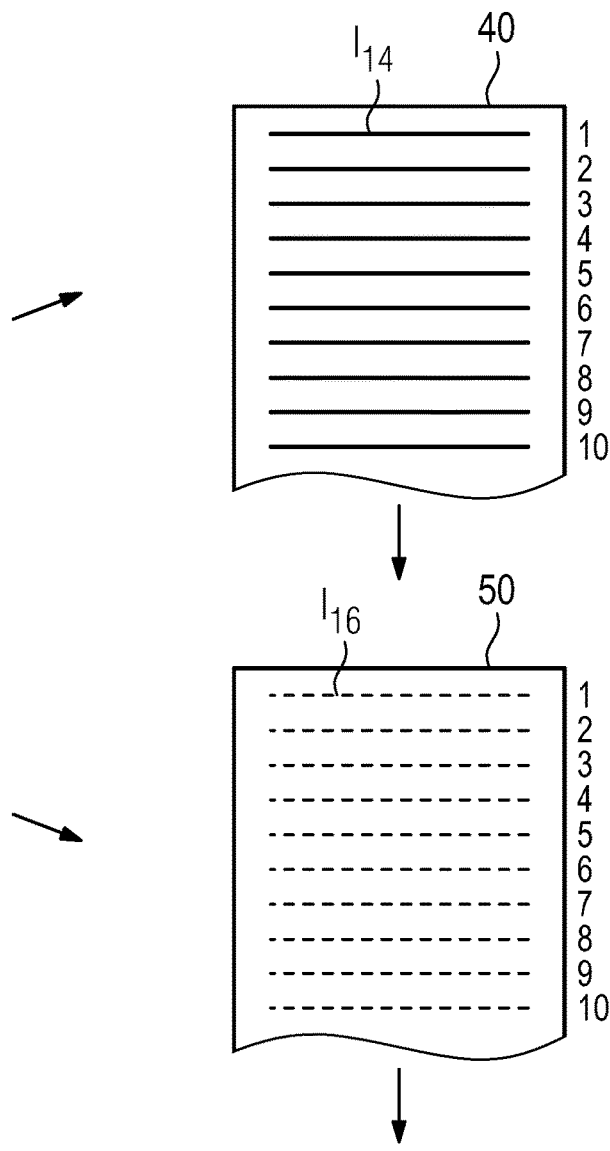
FIG. 6 schematically shows how reconstructed images are generated based on the line images captured under different illumination conditions.

FIG. 6 schematically shows how a reconstructed DFI image 40 is reconstructed from the line images $I_{14}$ and how a reconstructed BFI image 50 is reconstructed from line images $I_{16}$.

Should camera 12 capture line images under more than the two illumination conditions which are described here, BFI and DFI and shown in FIG. 5, then the data captured by camera 12 would consist of three or more types of interlaced line images, and three or more reconstructed images would be reconstructed, one for each illumination condition.

Image evaluation unit 18 processes the reconstructed images 40, 50, either entirely or in those portions which are of interest, in order to detect an item of interest. Here, the reconstructed images 40, 50 are compared in order to identify reflective surface portions.

It can occur that surface portions of the sheet element 4 which are not perpendicular to median plane M result in light being reflected towards the camera with such an intensity that the threshold is surpassed. This results in a false reading "artifact" which can be identified by the image evaluation unit 18 because of its dimensions in the x direction. Artifacts have length which is less than the usual length of surface portions with a highly reflective surface.

The surface inspection system 10 can be calibrated. This can be done either by placing a wide target in viewing area 20 or by moving a smaller target along the entire width of viewing area 20.

In addition, each LED or each group of LEDs is energized at an adjusted level along each illuminator to provide the same signal on the target along the width of viewing area 20.

The calibration is either used to adjust the operating power of the LEDs or to appropriately set the coefficient applied to the captured line images.

The invention claimed is:

1. A surface inspection system configured to determine a position of a glossy portion on a surface of a sheet element present in an inspection area, the surface inspection system comprising:
    a dark-field illuminator positioned and configured to illuminate, as dark field illumination, and a bright-field illuminator located and configured to illuminate, as bright field illumination, the surface of the sheet element;
    a camera configured to capture an image of the surface of the sheet element present in the inspection area;
    wherein light intensities of the dark-field illuminator and the bright-field illuminator are set such that when the sheet element being illuminated has a diffusely reflecting surface, light intensity reflected to the camera during the dark-field illumination is the same as the light intensity reflected to the camera during the bright-field illumination; and
    an image evaluation unit configured to receive the image and to determine the position of the glossy portion by subtracting a line image captured by the camera during the bright-field illumination condition from a line image captured by the camera during the dark-field illumination condition, or vice versa for the subtraction.

2. The surface inspection system of claim 1, wherein the camera is a line camera configured for capturing the line images.

3. The surface inspection system of claim 1, wherein the dark-field illuminator comprises a single row of LEDs and along the row two oppositely arranged reflectors are provided along the single row.

4. The surface inspection system of claim 1, wherein the bright-field illuminator comprises a plurality of the rows of LEDs, and the rows are arranged in parallel.

5. The surface inspection system as defined in claim 1, wherein an optical plane of the dark-field illuminator is at an angle of approximately 45° with respect to a median plane (M) which is perpendicular to the orientation of the viewing area.

6. The surface inspection system as defined in claim 1, wherein the optical plane of the bright-field illuminator is at an angle of approximately 30° with respect to a median plane (M) which is perpendicular to the orientation of the viewing area.

7. The surface inspection system as defined in claim 1, wherein the viewing plane of the camera is at an angle of approximately 20° with respect to a median plane (M) which is perpendicular to the orientation of the viewing area.

8. The surface inspection system of claim 1, wherein the camera has a resolving power, at the surface of the sheet element to be inspected, in a range of 0.1 to 0.6 mm.

9. A method of identifying a reflective surface area on a sheet element being moved through a sheet element processing machine, by using the system as defined in claim 1, the method comprising:
    capturing a line image of the surface of the sheet element in the viewing area under bright-field illumination conditions; and
    capturing a line image of the same surface of the sheet element in the viewing area under dark-field illumination conditions, and
    then comparing the two line images, by subtracting one from the other
    identifying the surface area as a reflective surface when a difference between the two line images is above a predefined threshold.

10. The method of claim 9, wherein the two line images are compared regarding their intensity.

11. The method of claim 9, wherein the line images are compared pixel by pixel.

12. The method of claim 9, further comprising:
    creating a first reconstructed image based on the line images captured under dark-field illumination and creating a second reconstructed image based on the line images captured under bright-field illumination conditions; and
    identifying reflective surfaces by comparing the first and the second reconstructed images.

13. The method of claim 9, wherein the camera is configured for capturing more than 10,000 line images.

14. The method of claim 9, further comprising moving the sheet element with respect to the surface inspection system at a speed in the order 5 to 15 m/s.

15. The method of claim 9, wherein the inspected sheet elements at least partially have a reflective surface.

16. The method of claim 13, wherein the method is performed while the sheet element is moved with respect to the surface inspection system at a speed in the order 5 to 15 m/s.

* * * * *